(12) United States Patent
Ito et al.

(10) Patent No.: US 9,511,768 B2
(45) Date of Patent: Dec. 6, 2016

(54) LANE OUTWARD DEVIATION AVOIDANCE ASSIST APPARATUS AND LANE OUTWARD DEVIATION AVOIDANCE ASSIST METHOD

(71) Applicant: HONDA MOTOR CO., LTD., Minato-ku, Tokyo (JP)

(72) Inventors: Makoto Ito, Utsunomiya (JP);
Shinnosuke Ishida, Tokorozawa (JP);
Kentaro Yamada, Saitama (JP);
Daisuke Hanzawa, Utsunomiya (JP);
Hiroyasu Kubota, Utsunomiya (JP);
Hiroyuki Kamiya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/675,938

(22) Filed: Apr. 1, 2015

(65) Prior Publication Data
US 2015/0307094 A1 Oct. 29, 2015

(30) Foreign Application Priority Data

Apr. 25, 2014 (JP) ................................ 2014-092008

(51) Int. Cl.
*G05D 1/00* (2006.01)
*B60W 30/12* (2006.01)
(Continued)

(52) U.S. Cl.
CPC .............. *B60W 30/12* (2013.01); *B60W 10/20* (2013.01); *B62D 15/025* (2013.01); *B60W 50/16* (2013.01); *B60W 2040/0827* (2013.01); *B60W 2050/0083* (2013.01); *B60W 2050/143* (2013.01)

(58) Field of Classification Search
CPC .... B60W 30/12; B60W 30/00; B60W 50/12; B60W 30/143; B62F 7/159; B62D 5/0463; B60T 8/172; B60R 16/0315

USPC .............. 701/1, 70, 45, 42, 41, 36; 340/937, 340/425.5, 436, 438
See application file for complete search history.

(56) References Cited

U.S. PATENT DOCUMENTS 7,603,215 B2 * 10/2009 Matsumoto ............ G08G 1/167
701/300
2003/0078712 A1 * 4/2003 Shimakage ............ B62D 1/286
701/41

(Continued)

FOREIGN PATENT DOCUMENTS

DE 102006051930 A1 5/2008
DE 102010022433 A1 12/2011

(Continued)

OTHER PUBLICATIONS

Office Action mailed Apr. 13, 2016 for corresponding German Application No. 102015207211.8.

*Primary Examiner* — Shardul Patel
(74) *Attorney, Agent, or Firm* — Carrier Blackman & Associates, P.C.; William D. Blackman; Jingli Wang (57) ABSTRACT

A lane outward deviation avoidance assist apparatus includes: a recognition device configured to recognize a travel lane of a vehicle; a deviation recognition part configured to recognize a deviation from the travel lane recognized by the recognition device or a deviation prediction from the travel lane; a control part configured to perform a deviation avoidance control for avoiding the deviation from the travel lane at least by a steering; and a deviation number count part configured to count the number of deviations from the travel lane recognized by the deviation recognition part within a predetermined duration or the number of deviation predictions from the travel lane, wherein the control part performs at least any one of the deviation avoidance control and an alarm output control when the number counted by the deviation number count part reaches n, n being a natural number more than 1.

12 Claims, 3 Drawing Sheets

(51) Int. Cl.
    *B62D 15/02*     (2006.01)
    *B60W 10/20*     (2006.01)
    *B60W 50/16*     (2012.01)
    *B60W 40/08*     (2012.01)
    *B60W 50/00*     (2006.01)
    *B60W 50/14*     (2012.01)

(56) References Cited

U.S. PATENT DOCUMENTS

| | | | | |
|---|---|---|---|---|
| 2003/0195667 | A1* | 10/2003 | Tange | B60K 31/0008 701/1 |
| 2007/0290823 | A1* | 12/2007 | Watanabe | B60Q 1/2665 340/435 |
| 2008/0055114 | A1* | 3/2008 | Kim | B60R 1/00 340/937 |
| 2009/0322506 | A1 | 12/2009 | Schmitz | |
| 2010/0030430 | A1* | 2/2010 | Hayakawa | B60T 8/17557 701/42 |
| 2010/0030434 | A1* | 2/2010 | Okabe | A61B 5/165 701/48 |
| 2011/0187515 | A1* | 8/2011 | Saito | B60T 7/22 340/425.5 |
| 2012/0019375 | A1* | 1/2012 | Kataoka | B60W 50/14 340/439 |
| 2012/0239255 | A1* | 9/2012 | Kojima | B60T 8/17557 701/42 |
| 2012/0283912 | A1* | 11/2012 | Lee | B62D 1/286 701/41 |
| 2013/0317698 | A1* | 11/2013 | Yoon | B62D 15/025 701/41 |
| 2014/0025257 | A1* | 1/2014 | Komoguchi | B60Q 5/005 701/36 |

FOREIGN PATENT DOCUMENTS

| | | |
|---|---|---|
| EP | 2143612 A1 | 1/2010 |
| JP | 2001-175999 A | 6/2001 |
| KR | 20130029985 A | 3/2013 |

\* cited by examiner

LANE OUTWARD DEVIATION AVOIDANCE ASSIST APPARATUS AND LANE OUTWARD DEVIATION AVOIDANCE ASSIST METHOD

CROSS-REFERENCE TO RELATED APPLICATION

Priority is claimed on Japanese Patent Application No. 2014-92008, filed on Apr. 25, 2014, the contents of which are incorporated herein by reference.

BACKGROUND

Field of the Invention

The present invention relates to a lane outward deviation avoidance assist apparatus and a lane outward deviation avoidance assist method.

Background

In the related art, a deviation avoidance apparatus is known which performs a plurality of different alarm operations by using a lateral displacement amount of a vehicle as a hazard degree that the vehicle deviates from a travel lane (for example, refer to Japanese Patent Application, Publication No. 2001-175999A).

SUMMARY

According to the deviation avoidance apparatus of the above related art, since it is set such that the adjustment of the vehicle location when the vehicle deviates from the travel lane is performed by the steering of a driver, there is a case in which it is impossible to prevent the deviation from the travel lane when a degree of wakefulness of the driver is low. With respect to such a problem, it is desired to cause the vehicle to get back to the travel lane by an automatic steering when the vehicle deviates from the travel lane or when it is predicted that the vehicle deviates from the travel lane. However, when the vehicle repeatedly gets back to the travel lane by the automatic steering which intermittently operates, there is a possibility that the driver is overconfident on the operation of the apparatus and does not perform a steering for deviation avoidance for oneself, and accordingly, there is a possibility that the degree of wakefulness of the driver decreases.

In view of the foregoing, an object of an aspect of the present invention is to provide a lane outward deviation avoidance assist apparatus and a lane outward deviation avoidance assist method, which are capable of preventing a driver from completely relying on an automatic deviation avoidance operation and preventing the degree of wakefulness of the driver from decreasing.

(1) A lane outward deviation avoidance assist apparatus according to an aspect of the present invention includes: a recognition device configured to recognize a travel lane of a vehicle; a deviation recognition part configured to recognize a deviation from the travel lane recognized by the recognition device or a deviation prediction from the travel lane; a control part configured to perform a deviation avoidance control for avoiding the deviation from the travel lane at least by a steering; and a deviation number count part configured to count a number of deviations from the travel lane recognized by the deviation recognition part within a predetermined duration or a number of deviation predictions from the travel lane, wherein the control part performs at least any one of the deviation avoidance control and an alarm output control when the number counted by the deviation number count part reaches n, n being a natural number more than 1.

(2) The lane outward deviation avoidance assist apparatus according to the above (1) may further include: a speech output part configured to output a speech in the alarm output control performed by the control part, wherein the control part, in the alarm output control, may output from the speech output part a speech which indicates that at least the deviation avoidance control will not be performed for avoiding the deviation from the travel lane when the number counted by the deviation number count part reaches n+1.

(3) In the lane outward deviation avoidance assist apparatus according to the above (1) or (2), the control part may perform only the alarm output control when the number counted by the deviation number count part reaches n+1.

(4) The lane outward deviation avoidance assist apparatus according to any one of the above (1) to (3) may further include: a display part configured to display that the control part is in operation in order to avoid the deviation from the travel lane, wherein the control part may change a display content of the display part when the number counted by the deviation number count part reaches n+1.

(5) The lane outward deviation avoidance assist apparatus according to any one of the above (1) to (4) may further include: a degree of wakefulness determination part configured to determine a degree of wakefulness of a driver of the vehicle, wherein the control part may perform the alarm output control even in a state where the number counted by the deviation number count part does not reach n when the degree of wakefulness determination part determines that the degree of wakefulness of the driver is low.

(6) A lane outward deviation avoidance assist method according to another aspect of the present invention is a lane outward deviation avoidance assist method performed by a lane outward deviation avoidance assist apparatus including a recognition device configured to recognize a travel lane of a vehicle, a deviation recognition part configured to recognize a deviation from the travel lane recognized by the recognition device or a deviation prediction from the travel lane, and a control part configured to perform a deviation avoidance control for avoiding the deviation from the travel lane at least by a steering, the method including: (a) by way of the control part, causing the vehicle to get back to the travel lane by performing the deviation avoidance control when, with respect to first and second travel section lines which divide the travel lane in a width direction, the deviation recognition part recognizes the deviation or the deviation prediction based on the first travel section line; (b) by way of the control part, causing the vehicle to get back to the travel lane by performing the deviation avoidance control when the deviation recognition part recognizes the deviation or the deviation prediction based on the second travel section line after performing the (a); (c) by way of the control part, when the deviation recognition part recognizes the deviation or the deviation prediction based on the first travel section line after performing the (b), causing the vehicle to get back to the travel lane by performing the deviation avoidance control, and performing an alarm output control.

(7) A lane outward deviation avoidance assist method according to still another aspect of the present invention is a lane outward deviation avoidance assist method performed by a lane outward deviation avoidance assist apparatus including a recognition device configured to recognize a travel lane of a vehicle, a deviation recognition part configured to recognize a deviation from the travel lane recognized by the recognition device or a deviation prediction from the travel lane, a control part configured to perform a deviation avoidance control for avoiding the deviation from the travel lane at least by a steering, and a deviation number count part configured to count a number of deviations from the travel lane recognized by the deviation recognition part within a predetermined duration or a number of deviation predictions from the travel lane, the method including: by way of the control part, performing at least any one of the deviation avoidance control and an alarm output control when the number counted by the deviation number count part reaches n, n being a natural number more than 1.

According to the lane outward deviation avoidance assist apparatus of the above aspect (1), by including the control part configured to set the predetermined number n for the number of deviations from the travel lane or the number of deviation predictions from the travel lane and perform at least any of the deviation avoidance control and the alarm output control, it is possible to prevent the driver from completely relying on the operation of the deviation avoidance control by the control part. That is, it is possible to prevent at least any of the deviation avoidance control and the alarm output control by the control part from being unlimitedly performed regardless of the number of deviations from the travel lane or the number of deviation predictions from the travel lane and to prevent the vehicle from being automatically driven. Accordingly, it is possible to prevent the degree of wakefulness of the driver from decreasing.

Further, according to the above (2), by including the control part which does not perform the deviation avoidance control when the number of deviations from the travel lane or the number of deviation predictions from the travel lane exceeds the predetermined number n, it is possible to prevent the driver from completely relying on the operation of the deviation avoidance control by the control part. Further, by including the control part which reports in advance by speech that the deviation avoidance control will not be performed, it is possible to safely perform a stop operation of the deviation avoidance control.

Further, according to the above (3), by including the control part which performs only the alarm output control when the number of deviations from the travel lane or the number of deviation predictions from the travel lane exceeds the predetermined number n, it is possible to prevent the driver from completely relying on the operation of the deviation avoidance control by the control part.

Further, according to the above (4), by including the control part which changes the display content when the number of deviations from the travel lane or the number of deviation predictions from the travel lane is n+1, it is possible to prompt an increase of the degree of wakefulness of the driver and to prevent the degree of wakefulness from decreasing.

Further, according to the above (5), by including the control part which performs the alarm output control when the degree of wakefulness of the driver is low, it is possible to prompt an increase of the degree of wakefulness of the driver and to prevent the degree of wakefulness from decreasing.

According to the lane outward deviation avoidance assist method of the above aspect (6), by including performing the alarm output control in addition to the deviation avoidance control when periodic deviations or periodic deviation predictions are recognized with respect to both sides in the width direction of the travel lane, it is possible to prevent the driver from completely relying on the operation of the deviation avoidance control. Accordingly, it is possible to prevent the degree of wakefulness of the driver from decreasing.

According to the lane outward deviation avoidance assist method of the above aspect (7), by including setting the predetermined number n for the number of deviations from the travel lane or the number of deviation predictions from the travel lane and performing at least any of the deviation avoidance control and the alarm output control, it is possible to prevent the driver from completely relying on the operation of the deviation avoidance control. That is, it is possible to prevent at least any of the deviation avoidance control and the alarm output control from being unlimitedly performed regardless of the number of deviations from the travel lane or the number of deviation predictions from the travel lane and to prevent the vehicle from being automatically driven. Accordingly, it is possible to prevent the degree of wakefulness of the driver from decreasing.

DESCRIPTION OF THE EMBODIMENTS

Hereinafter, a lane outward deviation avoidance assist apparatus and a lane outward deviation avoidance assist method according to an embodiment of the present invention will be described with reference to the accompanying drawings.

Figure 1:
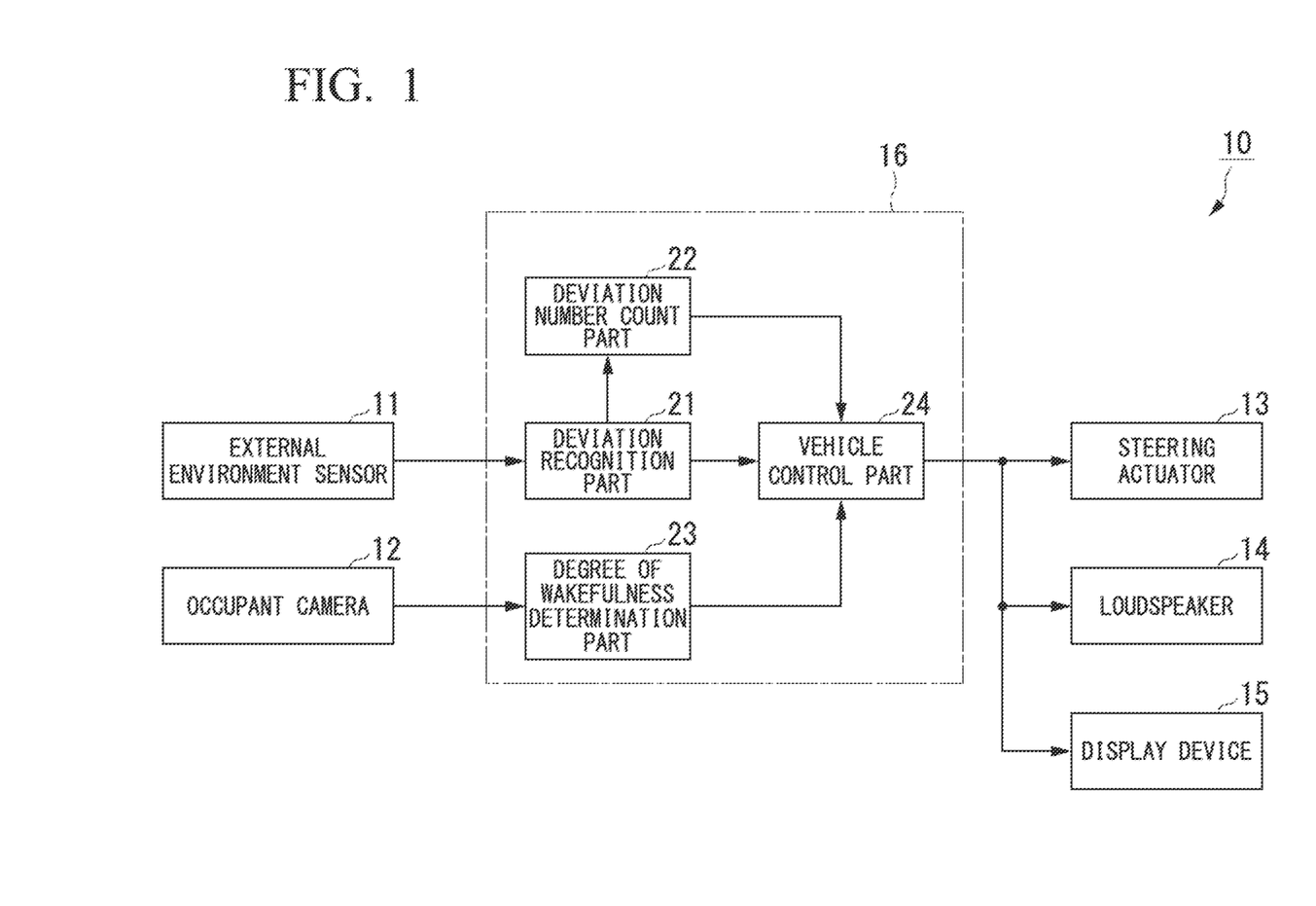
FIG. 1 is a configuration diagram of a lane outward deviation avoidance assist apparatus according to an embodiment of the present invention.

A lane outward deviation avoidance assist apparatus 10 according to the present embodiment is provided on a vehicle and includes, as shown in FIG. 1, an external environment sensor 11 (recognition device), an occupant camera 12, a steering actuator 13, a loudspeaker 14 (speech output part), a display device 15 (display part), and a process device 16 (recognition device).

The external environment sensor 11 is configured to include, for example, a radar device (not shown) and a camera (not shown).

The radar device divides a detection target region set in the external environment of the vehicle into a plurality of angle regions and transmits transmission signals of electromagnetic waves such that each angle region is scanned. Then, the radar device receives a reflection signal of a reflection wave arising from each transmission signal being reflected by an external object of the vehicle. Then, the radar device generates detection signals depending on the transmission signal and the reflection signal, for example, a detection signal according to the distance from the radar device to the external object and a detection signal according to the relative speed of the external object due to the Doppler effect, or the like, and outputs the detection signals to the process device 16.

The camera captures an image of an image capture region set in the external environment of the vehicle. Then, by performing a suitable image processing on the image obtained by the image capture, the camera generates image data and outputs the image data to the process device 16.

The occupant camera 12 outputs a face image including at least the face of a driver seated in the driver seat as an image capture target in the image capture region and including the face of the driver in a visible light region and an infrared light region.

The steering actuator 13 performs the driving of a steering wheel (not shown), the driving of the vehicle, the steering of the vehicle, and the change in direction of the vehicle in response to a command signal output from the process device 16.

The loudspeaker 14 outputs a variety of speech, signal sounds, and the like in response to a command signal output from the process device 16.

The display device 15 performs a variety of display in response to a command signal output from the process device 16.

The process device 16 is configured by an electronic circuit including a CPU (Central Processing Unit), a storage medium such as a RAM (Random Access Memory), a timer, and the like. The process device 16 includes a deviation recognition part 21, a deviation number count part 22, a degree of wakefulness determination part 23, and a vehicle control part 24 (control part).

The deviation recognition part 21 recognizes a travel lane of the vehicle and a travel section line (for example, a white line or the like) which divides the travel lane in the width direction by use of at least any of the detection signal and image data output from the external environment sensor 11. The deviation recognition part 21 recognizes whether or not the vehicle deviates from the travel lane depending on the positions of the recognized travel lane and the recognized travel section line. Further, the deviation recognition part 21 predicts whether or not the vehicle will deviate from the travel lane based on the positions of the recognized travel lane and the recognized travel section line.

The deviation number count part 22 counts the number of deviations or the number of deviation predictions (deviation number) of the vehicle from the travel lane recognized by the deviation recognition part 21 within a predetermined duration.

The degree of wakefulness determination part 23 detects the line of sight, the face direction, the eyelid state, and the like of the driver by use of the face image of the driver output from the occupant camera 12 and determines, based on the detection result, whether or not the driver is in a non-awaking state in which the degree of wakefulness of the driver is decreased.

The vehicle control part 24 controls each of the steering actuator 13, the loudspeaker 14, and the display device 15 depending on the operation of each of the deviation recognition part 21, the deviation number count part 22, and the degree of wakefulness determination part 23.

For example, the vehicle control part 24 outputs an alarm and performs the deviation avoidance control when the deviation number counted by the deviation number count part 22 is less than n, n being a natural number more than 1. The vehicle control part 24 outputs an alarm by at least any of a tactile manner, a visual manner, and an auditory manner. As the tactile alarm, the vehicle control part 24, for example, applies a predetermined tightening force to a seat belt (not shown) and vibrates a steering wheel (not shown). As the visual alarm, the vehicle control part 24 displays a variety of alarm display on the display device 15 and lights a lamp (not shown). As the auditory alarm, the vehicle control part 24 outputs a variety of speech or electric sounds from the loudspeaker 14. The vehicle control part 24 avoids the deviation of the vehicle from the travel lane or causes the vehicle to get back to the travel lane from the outside of the travel lane by at least the change in direction due to the driving of the steering actuator 13 in the deviation avoidance control.

For example, the vehicle control part 24 performs at least any one of the deviation avoidance control and the alarm output control when the deviation number counted by the deviation number count part 22 reaches n. In the alarm output control when the deviation number counted by the deviation number count part 22 is n, the vehicle control part 24 outputs, from the loudspeaker 14, speech which indicates that next time (that is, when the deviation number counted by the deviation number count part 22 reaches n+1) at least the deviation avoidance control will not be performed for avoiding the deviation of the vehicle from the travel lane.

Further, the vehicle control part 24 performs only the alarm output control when the deviation number counted by the deviation number count part 22 reaches n+1. The vehicle control part 24 displays predetermined display indicating that a variety of operations in order to avoid the deviation of the vehicle from the travel lane are performed on the display device 15 before the deviation number counted by the deviation number count part 22 becomes n+1. The vehicle control part 24 changes the display content of the display device 15, for example, by use of display (such as image display of a steering wheel) which prompts a steering operation or the like when the deviation number counted by the deviation number count part 22 reaches n+1.

Further, the vehicle control part 24 performs an alarm output control similar to that performed when the counted deviation number reaches n, even in a state where the deviation number counted by the deviation number count part 22 does not reach n when the degree of wakefulness determination part 23 determines that the degree of wakefulness of the driver is low. That is, even in a case where the deviation number is counted the next time by the deviation number count part 22, the vehicle control part 24 outputs, from the loudspeaker 14, speech which indicates that at least the deviation avoidance control will not be performed for avoiding the deviation of the vehicle from the travel lane.

The lane outward deviation avoidance assist apparatus 10 according to the present embodiment includes the above configuration. Next, an operation of the lane outward deviation avoidance assist apparatus 10, that is, an outward deviation avoidance assist method is described.

Figure 2:
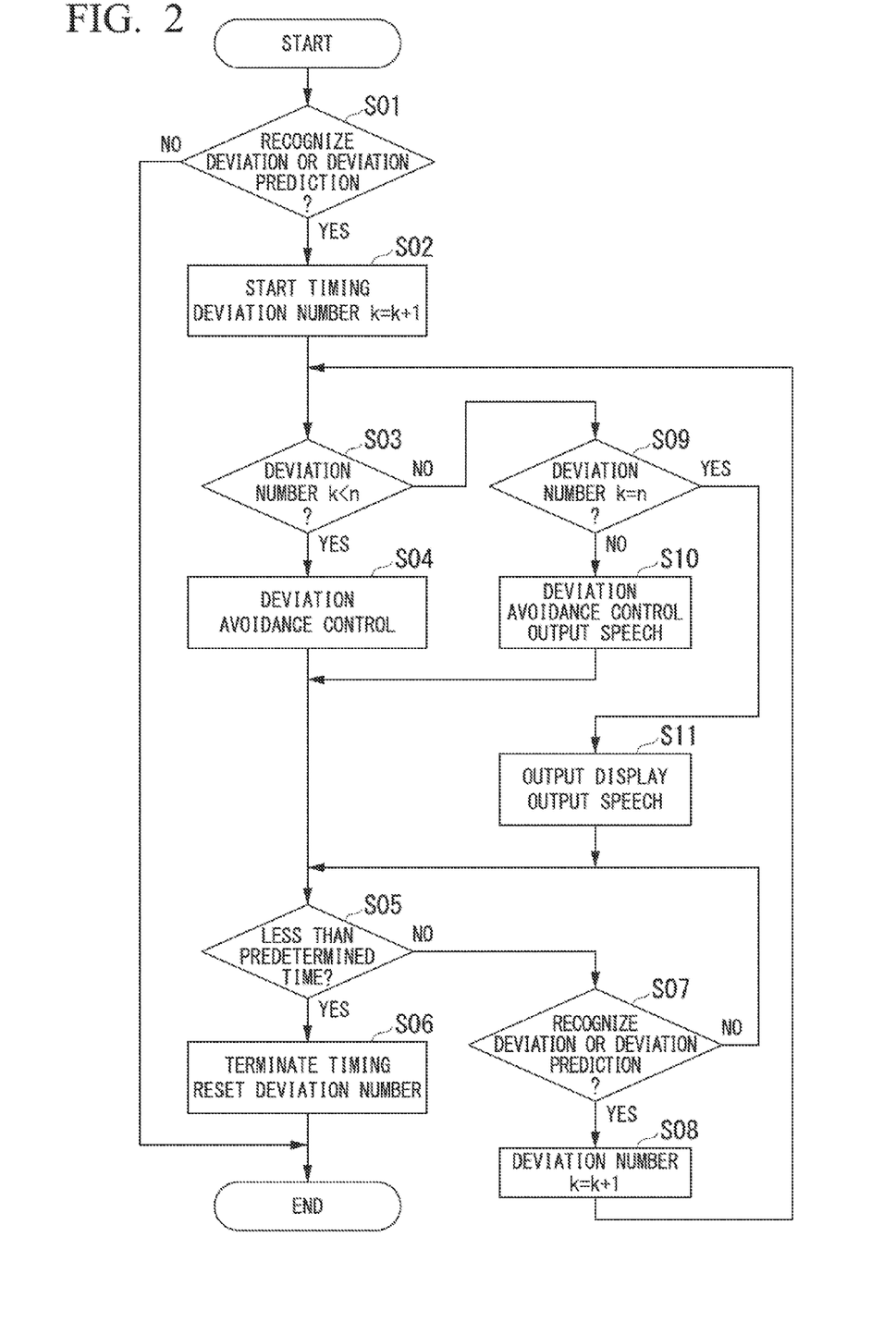
FIG. 2 is a flowchart showing an operation of the lane outward deviation avoidance assist apparatus, that is, a lane outward deviation avoidance assist method according to the embodiment of the present invention.

First, as shown in FIG. 2, the vehicle control part 24 determines whether or not a deviation of a vehicle from a travel lane or a deviation prediction is recognized by the deviation recognition part 21 (step S01).

When the determination result is "NO, the vehicle control part 24 terminates the process (step S01: NO).

On the other hand, when the determination result is "YES, the vehicle control part 24 advances the process to step S02 (step S01: YES).

Next, the vehicle control part 24 starts timing by use of a timer (not shown) and counts up a deviation number k (step S02).

Next, the vehicle control part 24 determines whether or not the deviation number k is less than a predetermined number n (step S03).

When the determination result is "NO, the vehicle control part 24 advances the process to step S09 described below (step S03: NO).

On the other hand, when the determination result is "YES, the vehicle control part 24 advances the process to step S04 (step S03: YES).

Next, the vehicle control part 24 outputs, as a deviation avoidance control, a regular alarm by at least any of a tactile manner, a visual manner, and an auditory manner and avoids the deviation of the vehicle from the travel lane by at least a steering due to a driving of the steering actuator 13 (step S04).

Next, the vehicle control part 24 determines whether or not the elapsed time of the timing by use of the timer (not shown) is less than a predetermined time (step S05).

When the determination result is "NO, the vehicle control part 24 advances the process to step S07 described below (step S05: NO).

On the other hand, when the determination result is "YES, the vehicle control part 24 advances the process to step S06 (step S05: YES).

Next, the vehicle control part 24 terminates the timing by use of the timer (not shown) and resets the deviation number k to zero (step S06). Then, the vehicle control part 24 terminates the series of steps.

Further, the vehicle control part 24 determines whether or not the deviation of the vehicle from the travel lane or the deviation prediction is recognized by the deviation recognition part 21 (step S07).

When the determination result is "NO, the vehicle control part 24 sets the process back to step S05 described above (step S07: NO).

On the other hand, when the determination result is "YES, the vehicle control part 24 advances the process to step S08 (step S07: YES).

Next, the vehicle control part 24 counts up the deviation number k (step S08). Then, the vehicle control part 24 sets the process back to step S03 described above.

Further, the vehicle control part 24 determines whether or not the deviation number k is equal to the predetermined number n (step S09).

When the determination result is "NO, the vehicle control part 24 advances the process to step S10 (step S09: NO).

On the other hand, when the determination result is "YES, the vehicle control part 24 advances the process to step S11 (step S09: YES).

Next, the vehicle control part 24 outputs, as a deviation avoidance control, a regular alarm by at least any of a tactile manner, a visual manner, and an auditory manner and avoids a deviation of the vehicle from the travel lane by at least a steering due to a driving of the steering actuator 13 (step S10). Further, as an alarm output control, the vehicle control part 24 outputs, from the loudspeaker 14, speech which indicates that next time (that is, when the deviation number counted by the deviation number count part 22 reaches n+1) at least the deviation avoidance control will not be performed for avoiding the deviation of the vehicle from the travel lane. Then, the vehicle control part 24 advances the process to step S05 described above.

Further, as an alarm output control, the vehicle control part 24 changes the display content of the display device 15, for example, by use of display which prompts performing a drive operation or the like, in place of a predetermined display indicating that a variety of operations are being performed in order to avoid the deviation of the vehicle from the travel lane (step S11). Then, the vehicle control part 24 advances the process to step S05 described above.

Figure 3:
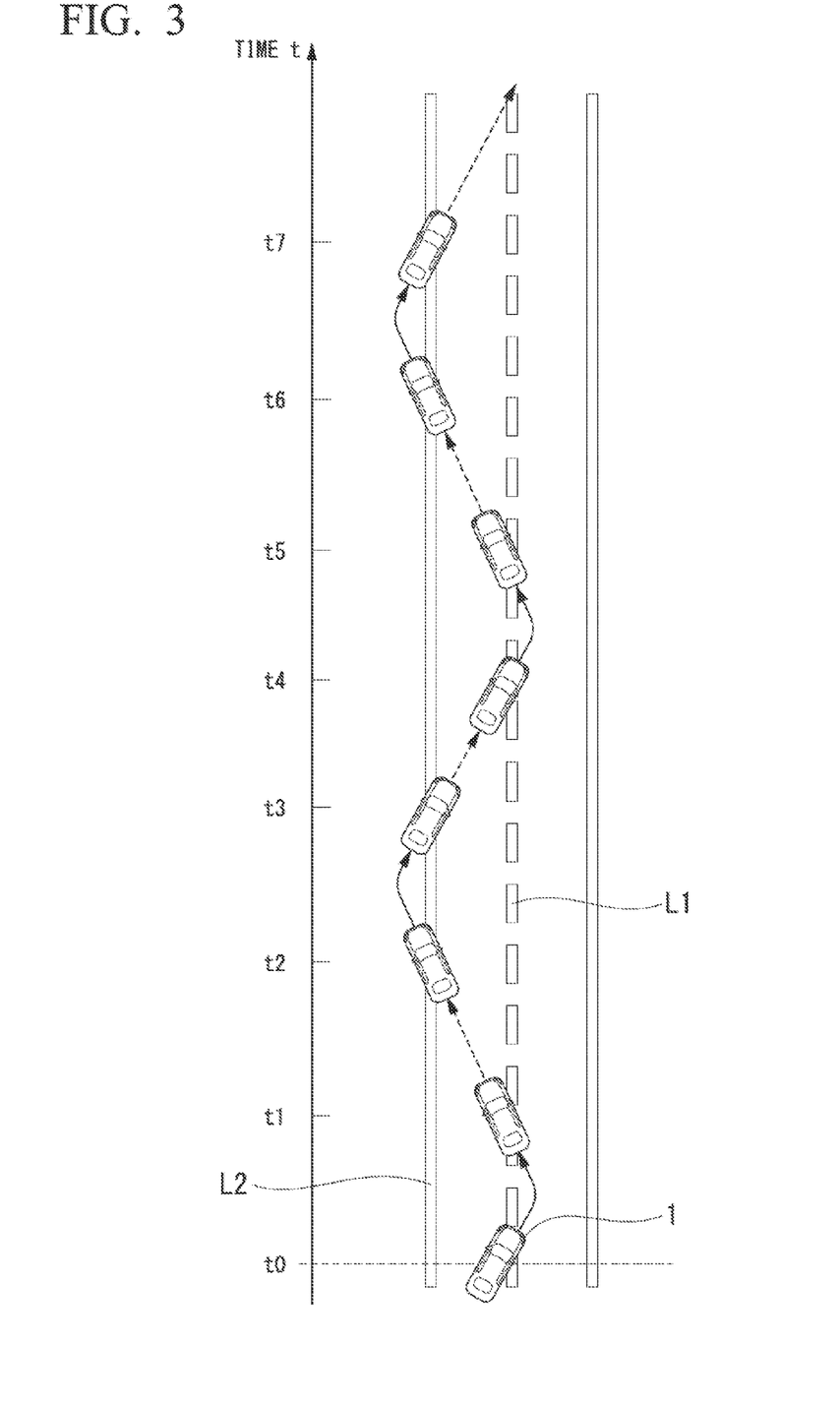
FIG. 3 is a diagram showing an example of a travel behavior of a vehicle in response to a deviation avoidance control performed by a vehicle control part of the lane outward deviation avoidance assist apparatus according to the embodiment of the present invention.

For example, as shown in FIG. 3, first, when a vehicle 1 which travels a two-lane road of a left-hand traffic deviates from the travel lane with respect to a right-side travel section line (center line) L1 as indicated by a time t0, the vehicle control part 24 outputs an alarm by at least any of a tactile manner, a visual manner, and an auditory manner and starts the operation of a first deviation avoidance control. For example, the vehicle control part 24 outputs, when a deviation amount is less than a predetermined value, a tactile alarm by way of the vibration of the steering wheel or the like and outputs, when the deviation amount is the predetermined value or more, an auditory alarm or a visual alarm in addition to the tactile alarm. In accordance with an operation start of the deviation avoidance control, the vehicle control part 24 displays, on the display device 15, that the deviation avoidance control is in operation. In the deviation avoidance control, the vehicle control part 24 steers the vehicle 1 to the left side of the travel direction for a predetermined duration (for example, within 5 seconds or the like). Thereby, the vehicle 1 turns to the left side of the travel direction, and as indicated by a time t1, the vehicle 1 gets back to the travel lane. Then, the vehicle control part 24 stops the alarm output, stops the operation of the deviation avoidance control, and displays, on the display device 15, that the operation of the deviation avoidance control is stopped.

Note that, when a steering by the driver is performed during the operation of the deviation avoidance control, the vehicle control part 24 avoids the steering assist by way of the deviation avoidance control. Further, when the travel behavior of the vehicle 1 becomes stable due to the steering by the driver or the like, the vehicle control part 24 promptly stops the operation of the deviation avoidance control even if the elapsed time is less than the predetermined duration.

Next, when a steering by the driver is not performed after the travel direction of the vehicle 1 is changed or when the steering amount by the driver is less than a predetermined value, the vehicle control part 24 displays, on the display device 15, that a drive control input is decreased.

Then, as indicated by a time t2, when the vehicle 1 deviates from the travel lane with respect to a left-side travel section line L2, the vehicle control part 24 outputs an alarm by at least any of a tactile manner, a visual manner, and an auditory manner and starts the operation of a second deviation avoidance control. For example, the vehicle control part 24 outputs, when a deviation amount is less than a predetermined value, a tactile alarm by way of the vibration of the steering wheel or the like and outputs, when the deviation amount is the predetermined value or more, an auditory alarm or a visual alarm in addition to the tactile alarm. In accordance with an operation start of the deviation avoidance control, the vehicle control part 24 displays, on the display device 15, that the deviation avoidance control is in operation. In the deviation avoidance control, the vehicle control part 24 steers the vehicle 1 to the right side of the travel direction for a predetermined duration (for example, within 5 seconds or the like). Thereby, the vehicle 1 turns to the right side of the travel direction, and as indicated by a time t3, the vehicle 1 gets back to the travel lane. Then, the vehicle control part 24 stops the alarm output, stops the operation of the deviation avoidance control, and displays, on the display device 15, that the operation of the deviation avoidance control is stopped.

Note that, when a steering by the driver is performed during the operation of the deviation avoidance control, the vehicle control part 24 avoids the steering assist by way of the deviation avoidance control. Further, when the travel behavior of the vehicle 1 becomes stable due to the steering by the driver or the like, the vehicle control part 24 promptly stops the operation of the deviation avoidance control even the elapsed time is less than the predetermined duration.

Next, when a steering by the driver is not performed after the travel direction of the vehicle 1 is changed or when the steering amount by the driver is less than a predetermined value, the vehicle control part 24 displays, on the display device 15, that a drive control input is decreased.

Then, as indicated by a time t4, when the vehicle 1 deviates from the travel lane again with respect to the right-side travel section line L1, the vehicle control part 24 outputs an alarm by at least any of a tactile manner, a visual manner, and an auditory manner, starts the operation of a third deviation avoidance control, and performs an alarm output control. For example, the vehicle control part 24 outputs, when a deviation amount is less than a predetermined value, a tactile alarm by way of the vibration of the steering wheel or the like and outputs, when the deviation amount is the predetermined value or more, an auditory alarm or a visual alarm in addition to the tactile alarm. In accordance with an operation start of the deviation avoidance control, the vehicle control part 24 displays, on the display device 15, that the deviation avoidance control is in operation. In the deviation avoidance control, the vehicle control part 24 steers the vehicle 1 to the left side of the travel direction for a predetermined duration (for example, within 5 seconds or the like). Further, in an alarm output control, the vehicle control part 24 outputs, from the loudspeaker 14, speech which indicates that next time (that is, when the deviation number counted by the deviation number count part 22 reaches four) at least the deviation avoidance control will not be performed for avoiding the deviation of the vehicle 1 from the travel lane. Thereby, the vehicle 1 turns to the left side of the travel direction, and as indicated by a time t5, the vehicle 1 gets back to the travel lane. Then, the vehicle control part 24 stops the operations of the deviation avoidance control and the alarm output control and displays, on the display device 15, that the operation of the deviation avoidance control is stopped.

Note that, when a steering by the driver is performed during the operation of the deviation avoidance control, the vehicle control part 24 avoids the steering assist by way of the deviation avoidance control. Further, when the travel behavior of the vehicle 1 becomes stable due to the steering by the driver or the like, the vehicle control part 24 promptly stops the operation of the deviation avoidance control even if the elapsed time is less than the predetermined duration.

Next, when a steering by the driver is not performed after the travel direction of the vehicle 1 is changed or when the steering amount by the driver is less than a predetermined value, the vehicle control part 24 displays, on the display device 15, that a drive control input is decreased.

Then, as indicated by a time t6, when the vehicle 1 deviates from the travel lane again with respect to the left-side travel section line L2, the vehicle control part 24 outputs an alarm by at least any of a tactile manner, a visual manner, and an auditory manner and performs only an alarm output control without performing a fourth deviation avoidance control. In the alarm output control, the vehicle control part 24 outputs an auditory alarm and changes the display content of the display device 15, for example, by use of display (such as image display of a steering wheel) which prompts a steering operation or the like. Further, in the alarm output control, the vehicle control part 24 may output, from the loudspeaker 14, speech which indicates that at least the deviation avoidance control will not be performed also next time (that is, when the deviation number counted by the deviation number count part 22 reaches five) for avoiding the deviation of the vehicle 1 from the travel lane. Thereby, the vehicle 1 turns to the right side of the travel direction by the steering of the driver, and as indicated by a time t7, the vehicle 1 gets back to the travel lane. Then, the vehicle control part 24 stops the operation of the alarm output control.

As described above, according to the lane outward deviation avoidance assist apparatus 10 and the lane outward deviation avoidance assist method of the present embodiment, by including the vehicle control part 24 which sets a predetermined number n for the number of deviations from the travel lane or the number of deviation predictions from the travel lane and performs at least any of the deviation avoidance control and the alarm output control, it is possible to prevent the driver from completely relying on the operation of the deviation avoidance control by the vehicle control part 24. That is, it is possible to prevent at least any of the deviation avoidance control and the alarm output control by the vehicle control part 24 from being unlimitedly performed regardless of the number of deviations from the travel lane or the number of deviation predictions from the travel lane and to prevent the vehicle from being automatically driven. Accordingly, it is possible to prevent the degree of wakefulness of the driver from decreasing.

Further, by including the vehicle control part 24 which does not perform the deviation avoidance control when the number of deviations from the travel lane or the number of deviation predictions from the travel lane exceeds the predetermined number n, it is possible to prevent the driver from completely relying on the operation of the deviation avoidance control by the vehicle control part 24. Further, by including the vehicle control part 24 which reports in advance by speech that the deviation avoidance control will not be performed, it is possible to safely perform a stop operation of the deviation avoidance control.

Further, by including the vehicle control part 24 which performs only the alarm output control when the number of deviations from the travel lane or the number of deviation predictions from the travel lane exceeds the predetermined number n, it is possible to prevent the driver from completely relying on the operation of the deviation avoidance control by vehicle the control part 24.

Further, by including the vehicle control part 24 which changes the display content when the number of deviations from the travel lane or the number of deviation predictions from the travel lane is n+1, it is possible to prompt an increase of the degree of wakefulness of the driver and to prevent the degree of wakefulness from decreasing.

Further, by including the vehicle control part 24 which performs the alarm output control when the degree of wakefulness of the driver is low, it is possible to prompt an increase of the degree of wakefulness of the driver and to prevent the degree of wakefulness from decreasing.

Further, by performing the alarm output control in addition to the deviation avoidance control when periodic deviations or periodic deviation predictions are recognized with respect to both sides in the width direction of the travel lane, it is possible to prevent the driver from completely relying on the operation of the deviation avoidance control. Accordingly, it is possible to prevent the degree of wakefulness of the driver from decreasing.

Note that, the above embodiment is described using an example in which the vehicle 1 deviates alternately from the right and left travel section lines L1, L2 of the travel lane, for example, in FIG. 3; however, the embodiment is not limited thereto.

For example, when the deviations arise repeatedly only for any one of the right and left travel section lines L1, L2 due to an existence of a slope in the width direction of the travel lane, even when the deviations arise repeatedly only for any one of the right and left travel section lines L1, L2 in a curve and the like, or the like, it is possible to perform an operation similar to those of the embodiment described above.

The process device 16 of the lane outward deviation avoidance assist apparatus 10 according to the embodiment described above may be realized by a dedicated hardware. Further, the operation as the process device 16 may be realized by recording a program for performing the functions of the process device 16 on a computer-readable recording medium, reading the program recorded on the recording medium into a computer system, and executing the program. Here, the computer system may include an OS or hardware such as peripherals. The computer system may include a WWW system including a homepage providing environment (or display environment).

Examples of the computer-readable recording medium include portable mediums such as a flexible disk, a magneto-optical disk, a ROM, and a CD-ROM and a storage device such as a hard disk built in a computer system. Further, the computer-readable recording medium may include a medium that temporarily holds a program for a predetermined time, like a volatile memory (RAM) in a computer system serving as a server or a client in a case where the program is transmitted via a network such as the Internet or a communication circuit such as a telephone circuit.

The program may be transmitted from a computer system storing the program in a storage device or the like to another computer system via a transmission medium or by transmission waves in the transmission medium. Here, the transmission medium via which the program is transmitted means a medium having a function of transmitting information such as a network (communication network) such as the Internet or a communication circuit (communication line) such as a telephone circuit.

The program may be configured to realize a part of the above-mentioned functions.

Further, the program may be configured to realize the above-mentioned functions by combination with a program recorded in advance in a computer system, like a so-called differential file (differential program).

The above embodiment is described just as an example and is not intended to limit the scope of the invention. The novel embodiment described above can be implemented in a variety of other configurations, and a variety of omissions, substitutions, and modifications can be made without departing from the scope of the invention. The embodiment described above and the modified embodiments are included in the scope of the invention and included in the invention in the scope of the appended claims and the equivalent to the claimed invention.

What is claimed is:

1. A lane outward deviation avoidance assist apparatus comprising:
    a recognition device configured to recognize a travel lane of a vehicle;
    a deviation recognition part configured to recognize a deviation from the travel lane recognized by the recognition device or a deviation prediction from the travel lane;
    a control part configured to perform a deviation avoidance control for avoiding the deviation from the travel lane at least by a steering;
    a deviation number count part configured to count a number of deviations from the travel lane recognized by the deviation recognition part within a predetermined duration or a number of deviation predictions from the travel lane, and
    a speech output part configured to output a speech in an alarm output control when a speech alarm is activated, wherein:
    the control part is configured to perform at least one of the deviation avoidance control and the alarm output control when the number counted by the deviation number count part reaches n, n being a natural number more than 1; and
    when the speech alarm is activated, the control part, in the alarm output control, outputs, from the speech output part, a speech indicating that if the vehicle deviates from the travel lane one more time, the deviation avoidance control, for avoiding deviation from the travel lane, will not be performed.

2. The lane outward deviation avoidance assist apparatus according to claim 1, wherein the control part performs only the alarm output control when the number counted by the deviation number count part reaches n+1.

3. The lane outward deviation avoidance assist apparatus according to claim 1, further comprising:
    a display part configured to display that the control part is in operation in order to avoid the deviation from the travel lane,
    wherein the control part changes a display content of the display part when the number counted by the deviation number count part reaches n+1.

4. The lane outward deviation avoidance assist apparatus according to claim 1, further comprising:
    a degree of wakefulness determination part configured to determine a degree of wakefulness of a driver of the vehicle, wherein
    the control part performs the alarm output control even in a state where the number counted by the deviation number count part does not reach n when the degree of wakefulness determination part determines that the degree of wakefulness of the driver is low.

5. The lane outward deviation avoidance assist apparatus according to claim 1, wherein a vehicle control part outputs an alarm in at least one of a tactile manner, a visual manner, and an auditory manner, the alarm in the tactile manner including applying a predetermined tightening force to a seat belt and vibrating a steering wheel, the alarm in the visual manner including displaying a variety of alarms on a display device and lighting a lamp, the alarm in the auditory manner including outputting a variety of speech or electric sounds from the speech output part.

6. The lane outward deviation avoidance assist apparatus according to claim 1, further comprising a camera configured to output a face image including at least a face of a driver seated in a driver seat of the vehicle as an image capture target in an image capture region of the camera and including the face of the driver in a visible light region and an infrared light region.

7. The lane outward deviation avoidance assist apparatus according to claim 6, further comprising a degree of wakefulness determination part configured to detect at least one of a line of sight, a face direction, an eyelid state of the driver by use of the face image of the driver output from the camera and to determine whether the driver is in a non-awaking state in which a degree of wakefulness of the driver is decreased.

8. A lane outward deviation avoidance assist method performed by a lane outward deviation avoidance assist apparatus including a recognition device configured to recognize a travel lane of a vehicle, a deviation recognition part configured to recognize a deviation from the travel lane recognized by the recognition device or a deviation prediction from the travel lane, a control part configured to perform a deviation avoidance control for avoiding the deviation from the travel lane at least by a steering, and a speech output part configured to output a speech in an alarm output control performed by the control part, the method comprising:

(a) by way of the control part, causing the vehicle to get back to the travel lane by performing the deviation avoidance control when, with respect to first and second travel section lines which divide the travel lane in a width direction, the deviation recognition part recognizes the deviation or the deviation prediction based on the first travel section line;

(b) by way of the control part, causing the vehicle to get back to the travel lane by performing the deviation avoidance control when the deviation recognition part recognizes the deviation or the deviation prediction based on the second travel section line after performing the (a);

(c) by way of the control part, when the deviation recognition part recognizes the deviation or the deviation prediction based on the first travel section line after performing the (b), causing the vehicle to get back to the travel lane by performing the deviation avoidance control, and performing the alarm output control; and (d) by way of the control part, in the alarm output control, outputting from the speech output part a speech which indicates that if the vehicle deviates from the travel lane one more time, the deviation avoidance control, for avoiding deviation from the travel lane, will not be performed.

9. The lane outward deviation avoidance assist method according to claim 8, wherein a vehicle control part outputs an alarm in at least one of a tactile manner, a visual manner, and an auditory manner, the alarm in the tactile manner including applying a predetermined tightening force to a seat belt and vibrating a steering wheel, the alarm in the visual manner including displaying a variety of alarms on a display device and lighting a lamp, the alarm in the auditory manner including outputting a variety of speech or electric sounds from the speech output part.

10. A lane outward deviation avoidance assist method performed by a lane outward deviation avoidance assist apparatus including a recognition device configured to recognize a travel lane of a vehicle, a deviation recognition part configured to recognize a deviation from the travel lane recognized by the recognition device or a deviation prediction from the travel lane, a control part configured to perform a deviation avoidance control for avoiding the deviation from the travel lane at least by a steering, a deviation number count part configured to count a number of deviations from the travel lane recognized by the deviation recognition part within a predetermined duration or a number of deviation predictions from the travel lane, and a speech output part configured to output a speech in an alarm output control performed by the control part, the method comprising:

by way of the control part, performing at least any one of the deviation avoidance control and the alarm output control when the number counted by the deviation number count part reaches n, n being a natural number more than 1; and by way of the control part, in the alarm output control, outputting from the speech output part a speech which indicates that if the vehicle deviates from the travel lane one more time, at least the deviation avoidance control, for avoiding deviation from the travel lane, will not be performed.

11. The lane outward deviation avoidance assist method according to claim 10, wherein the control part performs only the alarm output control when the number counted by the deviation number count part reaches n+1.

12. The lane outward deviation avoidance assist method according to claim 10, wherein a vehicle control part outputs an alarm in at least one of a tactile manner, a visual manner, and an auditory manner, the alarm in the tactile manner including applying a predetermined tightening force to a seat belt and vibrates a steering wheel, the alarm in the visual manner including displaying a variety of alarms on a display device and lighting a lamp, the alarm in the auditory manner including outputting a variety of speech or electric sounds from the speech output part.

* * * * *